Aug. 21, 1951 E. TOTH 2,564,740

RADIO FREQUENCY TRANSFORMER

Filed April 27, 1948

INVENTOR.
EMERICK TOTH

BY M. C. Hayes

ATTORNEY

Patented Aug. 21, 1951

2,564,740

UNITED STATES PATENT OFFICE 2,564,740

RADIO-FREQUENCY TRANSFORMER

Emerick Toth, Takoma Park, Md.

Application April 27, 1948, Serial No. 23,610

8 Claims. (Cl. 178—44)

(Granted under the act of March 3, 1883, as amended April 30, 1928; 370 O. G. 757)

This invention relates to band selective electrical filter devices and more particularly to filter devices possessing a plurality of resonant circuits in which the degree of coupling of such circuits is maintained to provide a constant bandwidth during trimming operation.

Band pass filter devices are commonly employed in radio communication apparatus to effect separation between frequency bands in close proximity. Typically they are commonly employed in the intermediate frequency and radio frequency amplification systems of present day radio receivers. To achieve substantially uniform response over a wide frequency band and a sharply falling response on either side of the band, two anti-resonant tuned coupled circuits are generally used for each filter. The degree of coupling between the two circuits is usually adjusted to a value slightly below that required to produce the maximum mid-frequency response. Any increase in this degree of coupling will produce wider band response and would likely result in dual amplitude peaked response with serious amplitude variation between. Any decrease in the degree of coupling will narrow the response band, lessen the slope of the sides of the response band and reduce the overall amplitude response.

For simple double tuned coupled circuits having primary inductance $L_p$, secondary inductance $L_s$ and mutual coupling M therebetween, the coupling coefficient K is given mathematically by the equation:

$$K=\frac{M}{\sqrt{L_p.L_s}}$$

This indicates that for a given circuit, a change in $L_p$ and $L_s$ to align the circuits to the frequency of the band desired must be accompanied by an equivalent change in M if the same degree of coupling or a constant bandwidth is to be maintained. For mass production of fixed tuned radio circuits of the types requiring a minimum value of circuit capacity or requiring non-variable resonating condensers of the "fixed" type it is necessary that provision be made for adjusting the constant $L_p$ and $L_s$ to account for unavoidable variations in the amount of circuit capacity from one piece of apparatus to the next.

It is seen therefore, that conventional forms of inductively coupled circuits, each including a single inductance element, the two elements being magnetically coupled, will not permit such tuning without corresponding changes in the coupling coefficient K.

It is accordingly an object of the present invention to provide an improved form of band pass filter circuit.

It is a further object of the present invention to provide an improved form of band pass filter circuit inductively tunable to maintain a constant operating frequency and frequency bandwidth despite considerable variation in shunting capacitance.

Another object of the present invention is to provide a band pass filter of small physical size employing tunable inductors and permitting constant bandwidth operation or a constant coefficient of coupling over a wide range of shunting capacitance.

Other and further objects and features of the present invention will become apparent upon a careful consideration of the following detailed description when read in conjunction with the accompanying drawing in which.

In accordance with the general concepts of the present invention, a band selective filter arrangement is provided which is adjustable for variations in shunting capacitance to maintain a specific shape and frequency width of the selective frequency band. This frequency characteristic is obtained, without resorting to elements of large physical size, by providing paired anti-resonant electrical circuits coupled together in a novel manner. Conventional magnetic coupling between the circuits is minimized by a shield placed between them. In contrast to conventional circuit structure each anti-resonant circuit possesses a tapped inductive element, the taps of the inductive elements being coupled together by small capacitance of specific value to effect the desired degree of coupling. Signals are supplied to the circuit or removed therefrom between the two ends. In tuning each anti-resonant circuit, the portion between the two ends, across the signal is supplied or removed, is varied in inductance, producing simultaneously a variation in the ratio of the amount of inductance on each side of the tap point thereof with corresponding compensating variation in the amount of coupling.

Figure 1:
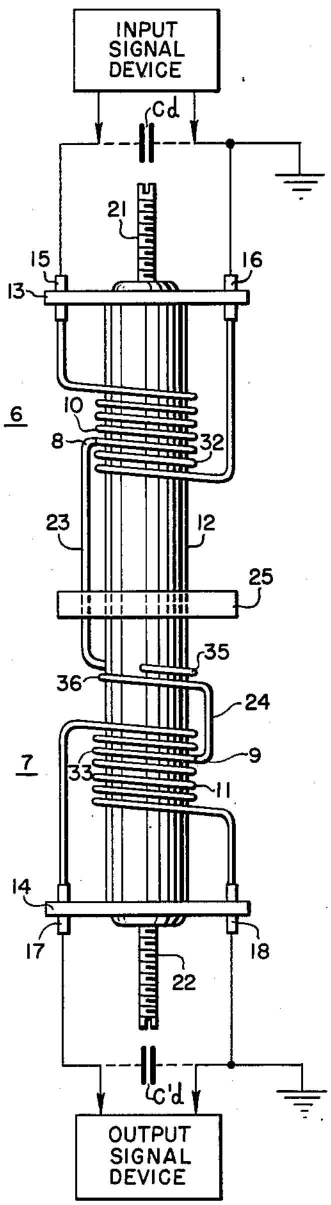
Fig. 1 shows in elevation a band pass filter system constructed in accordance with the teaching of the present invention with the shield can for the assembly removed and input and output signal devices shown.
Figure 2:
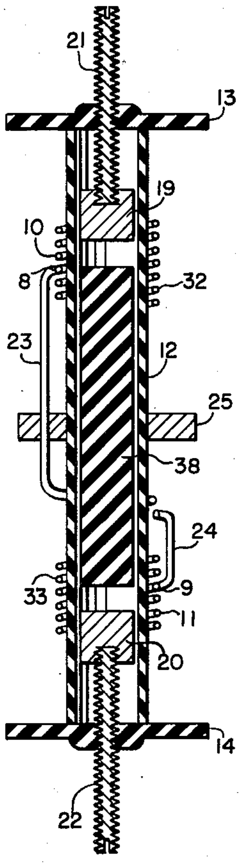
Fig. 2 shows a cross sectional view of the filter system illustrated in Fig. 1.

With particular reference now to Fig. 1, there is illustrated a typical band pass coupling unit for use in the intermediate frequency amplifier stages of a radio receiver. This unit, which is of the double-tuned coupled-circuit variety, consists of the two windings indicated in general by numerals 6 and 7, wound upon a suitable insulating supporting form 12. Form 12 is provided with end sections 13, 14 into which are fitted connecting terminals 15, 16, 17 and 18. The connecting terminals go to conventional input and output points in the amplifier circuit. Each of the windings 6 and 7 is anti-resonant with its distributed capacity and the capacity of the associated input or output circuit. The latter capacitance being indicated by reference characters *Cd* at the input and *C'd* at the output. The frequency of the anti-resonant circuits is adjusted by the positioning of adjustable slugs 19, 20 shown in Fig. 2. Slugs 19 and 20 may be of conventional paramagnetic composition for the frequencies employed. Positioning of slugs 19, 20 within the form 12 is by the screws 21, 22 which cooperate with threaded portions of end members 13, 14 or with threaded inserts placed therein. There is press fitted in the supporting form 12 a rod or cylinder 38 of non-magnetic material, with its ends positioned at tap points 8 and 9 to prevent motion of adjustable slugs 19 and 20 beyond the tap points for reasons detailed hereinafter.

In operation of the circuts, the terminals 16 and 18 are placed at ground potential for the signal frequencies to be passed and terminals 15 and 17 are connected to the input and output circuits respectively. As shown, wires 23 and 24 connect to intermediate or tap points 8 and 9 on their respective windings. The relative position of these tap points being dependent on the desired degree of coupling. The tap point wires 23 and 24 are wound as adjacent open turns 35 and 36 to form a small specific capacitance coupling. It may be preferred, however, to use a small capacitor to supplant the open ends.

Annular shield 25, consisting of metal of high conductivity, is placed between the primary and secondary windings 6 and 7 to reduce magnetic coupling therebetween, and to permit placing the windings in close physical proximity. It is not possible to eliminate change of linkage between the windings 6 and 7, due to the motion of the magnetic cores 19, 20 through the center portion of the form 12 during alignment or adjustment of inductance. This linkage will be a function of the spacing between slugs, so that a change of inductance of the windings by motion of the slugs results in changed coupling, making it impossible to maintain the same band pass characteristics over the range of position variation of the slugs.

In the preferred embodiment coupling is provided between windings 6 and 7 to permit variations in overall primary and secondary inductance for frequency adjustment, without experiencing a variation in the width of the overall pass frequency band. The taps 8 and 9 of the windings are coupled together by a small capacitance as heretofore explained. As the tuning slugs are moved together to effect a reduction in the resonant frequency of the windings, the inductance of that portion between terminal 15 and tap 8, indicated as 10, and between terminal 18 and 9, indicated as 11, increases while that portion between tap 8 and terminal 16, indicated as 32, and tap 9 and terminal 17, indicated as 33, remains substantially constant. The taps and capacitive coupling can be so proportioned that as the inductive coupling increases due to the motion of the slugs, the percentage of capacitive coupling is reduced to maintain constant bandwidth or coupling.

Figure 3:
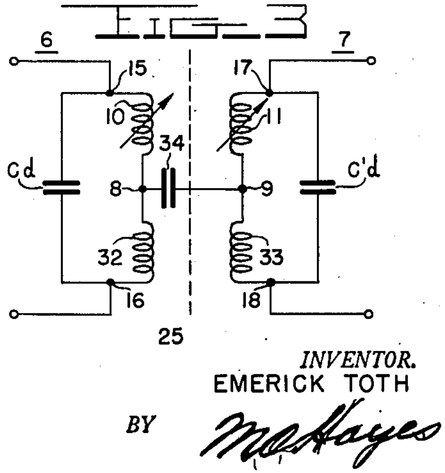
Fig. 3 shows an equivalent electrical circuit of the filter system illustrated in Figs. 1 and 2.

This form of coupling, to permit variations in overall primary and secondary inductance, may be better understood with the aid of the schematic diagram of Fig. 3, to which reference is now had. Points 16 and 18 represent the grounded terminals of the windings 6 and 7, respectively. Input signals are supplied to the upper terminal 15 of winding 6 and removed from the upper terminal 17 of winding 7. The variable portion of winding 6 is represented by the variable inductance 10, while the variable portion of winding 7 is represented by inductance 11. The portions of the windings 6 and 7 which are located between the ground point and the coupling capacitance are represented by non-variable inductances 32 and 33, while the coupling capacitance itself is shown by numeral 34. In this connection care must be taken to prevent sufficient penetration of slugs 19 and 20 into windings 6 and 7 to cause a variation in the inductance of these lower coupling portions, 32 and 33, such as shown in the preferred embodiment of Fig. 1 by means of stopping rod or cylinder 38.

From the foregoing discussion it is apparent that considerable modification of the features of this invention may be made and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A band selective filter having constant bandwidth over a range of variation of inductance and capacitance parameters comprising: a supporting form, first and second loosely coupled inductive elements wound about the supporting form, a tap point on each of said elements, means for supplying an input signal between the ends of the first inductive element, means for receiving an output signal between ends of the second inductive element, fixed capacitance means coupling the tap points of said elements, means varying the inductance of the portion of the first inductive element between the first turn thereof and its tap point to effect tuning of the first inductive element, and means varying the inductance of the portion of the second inductive element between the first turn thereof and its tap point to effect tuning of the second inductive element the position of said tap points being selected to provide a variation in the coupling through said fixed capacitance coupling means substantially equal and opposite to the variation in coupling caused by varying the inductance of said elements.

2. A band selective filter having a constant bandwidth over a range of variation of inductance and capacitance parameters, comprising: a supporting form, first and second loosely coupled inductive elements wound about the supporting form, a shield of high conductive material placed between the first and second inductive elements to reduce direct coupling therebetween, a tap point on each of said elements, means supplying an input signal between the ends of the first inductive element, means receiving an output signal between the ends of the second inductive element, fixed capacitance means coupling the tap points of said elements, means varying the inductance of the portion of the first inductive element between the first turn thereof and its tap point to effect tuning of the first inductive element, and means varying the inductance of the portion of the second inductive element between the first turn thereof and its tap point to effect tuning of the second inductive element the position of said tap points being selected to provide a variation in the coupling through said fixed capacitance coupling means substantially equal and opposite to the variation in coupling caused by varying the inductance of said elements.

3. A band pass filter device comprising, loosely coupled primary and secondary windings spatially disposed in coaxial relationship, fixed capacitance coupling means connecting an intermediate tap point on the primary winding to an intermediate tap point on said secondary winding, and means for independently adjusting the inductance of that portion of each of said windings between the corresponding winding ends and intermediate tap points the position of said tap points being selected to provide a variation in the coupling through said fixed capacitance coupling means substantially equal and opposite to the variation in coupling caused by varying the inductance of said windings.

4. A band pass filter device comprising, loosely coupled primary and secondary windings spatially disposed in coaxial relationship, a shielding member interposed between said windings for reducing coupling therebetween, fixed capacitance coupling means connecting an intermediate tap point on said primary winding to an intermediate tap point on said secondary winding, and means for independently adjusting the inductance of that portion of each of said windings between the corresponding winding ends and intermediate tap points the position of said tap points being selected to provide a variation in the coupling through said fixed capacitance coupling means substantially equal and opposite to the variation in coupling caused by varying the inductance of said windings.

5. A band pass filter device comprising, loosely coupled primary and secondary windings spatially disposed in coaxial relationship, a shielding member interposed between said windings for reducing coupling therebetween, a first section of conductor connected to an intermediate tap point on the primary winding and extending through said shield and terminating in a capacitive relationship with a second section of conductor connected to an intermediate tap point on the secondary winding for providing fixed capacitive coupling means between said windings, and means for independently adjusting the inductance of that portion of each of said windings included between the remote ends of the windings and the intermediate tap points the position of said tap points being selected to provide a variation in the coupling through said fixed capacitance coupling means substantially equal and opposite to the variation in coupling caused by varying the inductance of said windings.

6. A band pass filter device comprising loosely coupled primary and secondary windings spatially disposed in coaxial relationship, shielding means interposed between said windings for reducing coupling therebetween, fixed impedance coupling means connecting an intermediate tap point on said primary winding to an intermediate tap point on said secondary winding, and means for independently varying the inductance of that portion of each of said windings between the corresponding winding end and intermediate tap points, the position of said tap points being selected to provide a variation in the coupling through said fixed impedance means substantially equal and opposite to the variation in coupling caused by varying the inductance of said windings.

7. A high frequency coupling device comprising loosely coupled primary and secondary windings adapted to be coupled to input and output signal devices of various output and input capacitances respectively, shielding means interposed between said windings for reducing coupling therebetween, a tap point on each of said windings defining first and second winding sections, means for varying the inductance of each of said first sections to effect tuning of said coupling device to a predetermined frequency upon connection to said signal devices, and fixed impedance means connecting said tap points, the position of said tap points being selected to provide a variation in the coupling through said impedance means substantially equal and opposite to the variation in the coupling caused by varying the inductance of said windings.

8. A high frequency coupling device comprising a supporting form, loosely coupled primary and secondary windings spatially disposed in coaxial relationship about said supporting form and adapted to be coupled to input and output signal devices of various output and input capacitances respectively, a shielding member interposed between said windings for reducing coupling therebetween, a tap point on each of said windings defining first and second winding sections, means for independently varying the inductance of each of said first sections to effect tuning of said coupling to a predetermined frequency upon connection to said signal devices, and fixed capacitance means connecting said tap points, the position of said tap points being selected to provide a variation in the coupling through said capacitance means substantially equal and opposite to the variation in the coupling caused by varying the inductance of such windings.

EMERICK TOTH.

REFERENCES CITED

The following references are of record in the file of this patent:

UNITED STATES PATENTS

| Number | Name | Date |
|---|---|---|
| Re. 22,195 | Harnett | Oct. 6, 1942 |
| 2,106,226 | Schaper | Jan. 25, 1938 |
| 2,144,029 | Polydoroff | Jan. 17, 1939 |
| 2,227,038 | Schlesinger | Dec. 31, 1940 |
| 2,283,924 | Harvey | May 26, 1942 |
| 2,303,410 | Toth | Dec. 1, 1942 |
| 2,336,498 | Minter | Dec. 14, 1943 |